United States Patent [19]

George et al.

[11] Patent Number: 4,647,500

[45] Date of Patent: Mar. 3, 1987

[54] HIGH TEMPERATURE FLAME AND HEAT RESISTANT FOAMED PLASTICS

[75] Inventors: Stephen George; Thomas H. George, both of Clinton, N.J.

[73] Assignee: Subtex, Inc., New York, N.Y.

[21] Appl. No.: 810,861

[22] Filed: Dec. 18, 1985

Related U.S. Application Data

[60] Continuation-in-part of Ser. No. 598,864, Apr. 11, 1984, abandoned, which is a continuation-in-part of Ser. No. 585,909, Mar. 2, 1984, Pat. No. 4,507,355, and a continuation-in-part of Ser. No. 688,693, Jan. 4, 1985, which is a division of Ser. No. 585,909, Mar. 2, 1984, Pat. No. 4,507,355.

[51] Int. Cl.$^4$ .................... B32B 3/26; B32B 18/00
[52] U.S. Cl. ........................ 428/313.3; 106/38.35; 106/287.19; 106/287.34; 427/376.2; 427/419.1; 428/313.9; 428/319.1; 428/920; 428/921
[58] Field of Search .......... 106/38.35, 287.19, 287.34; 427/376.2, 419.1; 428/313.3, 313.9, 317.1, 317.7, 317.9, 319.1, 319.3, 319.7, 920, 921

[56] References Cited

U.S. PATENT DOCUMENTS

| | | | |
|---|---|---|---|
| 4,357,387 | 11/1982 | George et al. | 428/246 |
| 4,358,500 | 11/1982 | George et al. | 427/419.1 |
| 4,375,493 | 3/1983 | George et al. | 428/246 |
| 4,396,661 | 8/1983 | George et al. | 427/419.1 |
| 4,428,999 | 1/1984 | George et al. | 428/246 |
| 4,507,355 | 3/1985 | George et al. | 106/287.19 |
| 4,563,219 | 1/1986 | George et al. | 106/287.19 |

*Primary Examiner*—William J. Van Balen
*Attorney, Agent, or Firm*—Scully, Scott, Murphy & Presser

[57] ABSTRACT

The heat and flame resistance of foamed plastics is increased by coating the foamed plastic with an inorganic binder composition of colloidal silica, monoaluminum phosphate and aluminum chlorohydrate. The inorganic binder compositions may optionally contain an alkyl tin halide catalyst, a water soluble organic resin, an elastomer or additional inorganic additives. The inorganic binder composition may be employed in combination with dissimilar binders.

64 Claims, No Drawings

HIGH TEMPERATURE FLAME AND HEAT RESISTANT FOAMED PLASTICS

This application is a continuation-in-part of application Ser. No. 598,864, filed Apr. 11, 1984, now abandoned, which is a continuation-in-part of application Ser. No. 585,909, filed Mar. 2, 1984, now U.S. Pat. No. 4,507,355 and a continuation-in-part of application Ser. No. 688,693, filed Jan. 4, 1985, which is a division of application Ser. No. 585,909, filed Mar. 2, 1984, now U.S. Pat. No. 4,507,355.

BACKGROUND OF THE INVENTION

1. Field of the Invention

This invention relates to foamed plastics, also known as cellular plastic or plastic foams. More particularly, it relates to foamed plastics coated with binder compositions to increase the flame and heat resistance properties of the plastic foams.

This invention especially relates to foamed plastics having formed thereon coatings of an inorganic binder composition, optionally utilized in combination with a dissimilar binder.

2. Description of the Prior Art

Ceramics and/or glass fibers have been used heretofore to prepare high temperature electrical insulating tape. U.S. Pat. No. 4,358,500 discloses refractory coated insulating compositions wherein the refractory coating, comprising refractory materials and an inorganic bonding agent, is formed on the surface and, necessarily, the interstices of a porous base fabric, such as a knitted fiberglass fabric. In the presence of extreme temperatures and heat, the refractory materials fuse into the softened surface of the base fabric, enabling it to withstand intense heat, flame impingement, flame abrasion and elevated temperatures well beyond the normal temperature limitations of the fabric. The resulting fabric structure will have ceramic qualities and will not soften, melt, drip or lose its insulating properties.

The inorganic bonding agent disclosed in U.S. Pat. No. 4,358,500 is prepared from colloidal silica, monoaluminum phosphate (MAP) and aluminum chlorohydrate (ACH) by adding the MAP and ACH separately to the colloidal silica which acts as a liquid moderator. Although the compositions containing the inorganic bonding agent of U.S. Pat. No. 4,358,500 may be exposed to high temperatures, no products of combustion in the form of smoke or fumes are produced as with other prior art coated fabrics. Further, the refractory coated compositions prepared with the inorganic bonding agent proved superior to inorganic coatings available for use on fabrics or paper substrates. The latter inorganic coatings could be damaged by water. They could be wet by water and the water could solvate the coating to the point of causing the inorganic coating to dissociate itself from the substrate. Although other binders, such as the acrylics, inhibited this wetting action, they would burn off when subjected to flame and high temperature. The refractory coated substrates disclosed in the '500 patent, on the other hand, are not wetted by water and are not subject to the solvation action of water as are other inorganic coatings. However, despite these advantages, the refractory coated compositions of the '500 patent exhibit a very undesirable feature. This refractory coating must be applied to a porous fabric so that the coating will be placed in the interstices of the fabric. This is necessary to achieve the formation of the refractory coating on this fabric. However, this requires the use of a larger quantity of the refractory coating when preparing these compositions to the extent that the coating in many instances constitutes about 50% of the overall weight of the impregnated base fabric. The result of all this is that when this coated fabric is flexed, the bond of the refractory coating to the substrate is disrupted and some particles may be released to the surface resulting in "dusting" of the coating. This, of course, is highly undesirable despite the very desirable features of flame and high temperature resistance which are exhibited by these refractory coated compositions.

U.S. application Ser. No. 598,864, application Ser. No. 688,693, and application Ser. No. 585,909 (now U.S. Pat. No. 4,507,355) relate to improvements in the inorganic bonding agent disclosed in the '500 patent by preparing an inorganic bonding agent from colloidal silica, monoaluminum phosphate, aluminum chlorohydrate and an organic tin halide catalyst. When this bonding agent is combined with refractory material and applied to base fabrics, it provides refractory-binder coated compositions which do not "dust" as those disclosed in the '500 patent. Briefly, this improved inorganic binder comprises the three components of the prior art bonding agent of the '500 patent to which is added a catalyst which promotes the curing of the binder when it is applied to an appropriate surface and increases the bond between this surface and the binder compositions.

A foamed plastic has been defined as a plastic, the apparent density of which is decreased substantially by the presence of numerous cells disposed throughout its mass. As used herein, the terms foamed plastic, cellular plastic or plastic foam are used interchangeably to denote two-phase gas-solid systems in which the solid is continuous and may be composed of a synthetic polymer. Foamed plastics can be classified generally as either rigid or flexible and within the rigid foams structural foams are rigid foams produced at greater than about 320 kg/m$^3$ density.

Foamed plastics can be prepared by a variety of methods. The most important process consists of expanding a fluid polymer phase to a low density cellular state and then preserving this state. The foaming process consists usually of three steps: creating small discontinuities or cells in a fluid or plastic phase, causing these cells to grow to a desired volume and stabilizing this cellular structure by physical or chemical means. In the chemical stabilization, a fluid resin is polymerized into a three dimensional thermally set polymer, while in physical stabilization, an expanded thermoplastic polymer is cooled to a temperature below its second-order transition temperature or its crystalline melting point to prevent polymer flow.

The processes for preparing foamed plastics can be classified by techniques that are utilized in the cell growth and stabilization portions of the processes. Cell growth is initiated and controlled by lowering the external pressure or by increasing the internal pressure in the cells. Cell structure may be generated by dispersing gas in the fluid and then stabilizing this cellular state or by sintering polymer particles in a structure that contains a gas phase. Foamable compositions in which the pressure within the cells is increased have generally been called expandable formulations, while the cellular plastics produced by the decompression processes are catagorized by the methods employed in this process which includes extrusion, injection molding or compression molding. Among the polymers which may be utilized to prepare foamed plastics are polystyrene, poly(vinyl chloride), polyethylene, polyurethane, polyisocyanurate, polyphenols, epoxy resins, silicone resins, cellulose acetate, polyolefins, urea, formaldehyde resins, polyimide resins, polyamide resins, polyamide-imide resins and the like.

Examples of foamed plastics include foam polystyrene sheet used for meat and produce trays, egg cartons, snack food serving trays and disposable dinnerware. Foamed plastics also find use in their flexible form for comfort cushioning in automobile padding, seats, furniture, flooring, mattresses and pillows. Foam plastics also find use as thermal insulation, particularly in its rigid form. The low thermal conductivity of low density cellular polymers has been the main factor in their use as insulating materials for construction, pipe and vessel insulation and buoyancy devices in boats, floating docks and buoys. Rigid foamed plastics also find use as structural members in the construction industry.

When used as insulation in residential and commercial structures, in aircraft and ships, in electronic and electrical cabinets and for steam and fluid piping, these materials provide satisfactory low thermal conductivity properties. However, when subjected to high temperatures or flame abrasion, the foamed plastics may fail by melting and/or vaporizing to give off noxious and sometimes dangerous fumes. A means to improve the flame and heat resistance of such plastic foams would be extremely desirable and useful.

It is an object of this invention to provide plastic foams having improved heat and flame resistance.

It is another object of this invention to increase the heat and flame resistance of foamed plastics, especially those prepared from polymeric or resin materials, by providing coatings thereon to improve such properties.

It is a further object of this invention to provide a process for preparing foamed plastics having improved high temperature and flame resistance over the properties manifested by commercially available foamed plastics.

SUMMARY OF THE INVENTION

These and other objects of this invention have been achieved by applying an elastomer coating to the exterior surface of a flexible foamed plastic and then placing an inorganic binder, optionally combined with a dissimilar binder, over the silicone coating previously applied to the foamed plastic. Where the foamed plastics is of the rigid type, the elastomer coating is not necessary. The binder coated foamed plastic has a significantly improved resistance to high temperature and flame abrasion when compared to an uncoated control.

More particularly, in one embodiment this invention relates to a high temperature and flame resistant foamed plastic composition comprising: (a) a foamed plastic; (b) a first coating formed on the surface of the foamed plastic comprising an elastomer; and (c) a second coating of an inorganic binder composition formed on the surface of the first coating, said inorganic binder composition comprising colloidal silica, monoaluminum phosphate, and aluminum chlorohydrate. An alkyl tin halide catalyst may be optionally incorporated with the inorganic binder composition.

In another embodiment, this invention relates to a high temperature and flame resistant foamed plastic composition comprising: (a) a foamed plastic and (b) a coating formed on the surface of the foamed plastic comprising silicone elastomer, colloidal silica, monoaluminum phosphate, and aluminum chlorohydrate. An alkyl tin halide catalyst may be optionally incorporated with the inorganic binder composition.

In yet another embodiment, this invention relates to a method of preparing the above-described high temperature and flame resistant foamed plastic compositions, said method comprising: (a) forming a first coating of an aqueous colloidal suspension of an elastomer on the surface of a foamed plastic; (b) forming a second coating on the surface of the first coating of an inorganic binder composition comprising colloidal silica, monoaluminum phosphate, and aluminum chlorohydrate; and (c) heating the coated foamed plastic for a period of time and under heating conditions effective to provide the foamed plastic with a dry coated surface.

In another embodiment, this invention relates to a method of preparing a high temperature and flame resistant foamed plastic composition comprising:

(a) forming a coating on the surface of a foamed plastic of an inorganic binder composition comprising:
 (i) colloidal silica,
 (ii) monoaluminum phosphate, and
 (iii) aluminum chlorohydrate; and
(b) heating the coated foamed plastic for a period of time and under heating conditions effective to provide the foamed plastic with a dry coated surface.

In another embodiment, this invention relates to a binder composition comprising:

(a) about 1.0 to about 99.9 wt. % of an inorganic binder composition comprising:
 (i) colloidal silica,
 (ii) monoaluminum phosphate,
 (iii) aluminum chlorohydrate, and
 (iv) water; and
(b) about 99 to about 0.1 wt % of a dissimilar binder and water, said dissimilar binder being compatible with the inorganic binder composition.

DESCRIPTION OF THE PREFERRED EMBODIMENTS

Briefly, the present invention relates to foamed plastics having improved high temperature flame and heat resistance. By providing a specific coating or specific coatings on the surface of a foamed plastic, these improved properties can be obtained. In general, the basic coating employed practicing this invention is the inorganic binder composition of U.S. Pat. No. 4,358,500, optionally employing the organic tin halide catalyst of the applications of which this application is a continuation-in-part. Additional additives and/or dissimilar binders may be combined with or utilized in conjunction with the inorganic binder composition to provide further improvements or specifically desired properties.

The instant invention is a further improvement over those disclosed and claimed in the earlier filed applications of which this is a continuation-in-part. These applications, application Ser. Nos. 585,909 (now U.S. Pat. Nos. 4,507,355), 598,864 and 688,693, are incorporated herein by reference.

The inorganic binder composition employed in the practice of this invention is liquid and comprises colloidal silica, monoaluminum phosphate and aluminum chlorohydrate. Optionally, an alkyl tin halide catalyst can also be employed. This catalyst will provide an improved bonding between the binder composition and the surface to which it is applied. Monoaluminum phosphate and aluminum chlorohydrate cannot normally be employed in combination since when they are combined, the result is highly exothermic, providing a pliable mass which develops into a solid material. By employing the colloidal silica, which acts as a liquid moderator, the monoaluminum phosphate (MAP) and the aluminum chlorohydrate (ACH) may be used in combination to achieve the desired results.

Since the catalyst promotes the reaction of the components, when this optional component is employed, the binder composition has a definite pot time, usually about 2 to about 3 or more hours. In general, the more water added to the mixture, the longer the pot time.

Additional additives may be combined with the inorganic binder composition to further improve the temperature, flame and heat resistance of the final product. These additives may be used individually or in combination with each other to gain various improvements in the inorganic binder composition. Useful inorganic additives which may be employed with the inorganic binder composition include graphite, high temperature carbon, carbon fiber, alumina silica fiber, colloidal alumina, colloidal magnesium, alumina fiber, mica, refractory oxides and the like.

Soluble organic resins may also be added to the inorganic binder compositions. Such resins as phenolic, acrylic, styrene-butadiene, vinyl acrylic, polyvinyl chloride, polyvinylidene chloride, vinyl acetate, styrene, styrene acrylic, polyvinyl alcohol, polyurethane, silicone, polyester, polyamide, polyimide, polyamide-imide, polyimidimide, alkyd and the like may be usefully employed.

Where it is desirable to retain the flexibility of a flexible foamed plastic, which is to be provided with improved heat and flame resistance in accordance with the present invention, a pre-coat of an elastomer may be formed on the surface of the flexible foamed plastic before the inorganic binder composition is applied. Elastomers which may be usefully employed for this purpose include neoprene, nitrile, silicone, urethane and butadiene, with the silicone elastomer being particularly preferred. In an optional embodiment, the flexibility of a flexible foam can be retained by incorporating an elastomer into the inorganic binder composition itself. However, it is preferred to lay down the elastomer as a separate coating operation in order to achieve the best results. Where separate coatings are being applied, the elastomer coating may be dried before the inorganic binder composition is applied, but this is not essential. The inorganic binder composition may be applied while the elastomer coating is still wet.

Although the inorganic binder composition, including the optional inorganic additives, the organic resins and the elastomers described hereinbefore, may be employed to achieve the desired improved flame and heat resistance, the inorganic binder composition may be employed with in conjunction with a dissimilar binder such as those conventionally employed in preparing certain fiber, filament or yarn composites or materials. The relative amounts of the conventional, i.e., dissimilar, binder and the inorganic binder composition will be determined by a variety of factors, inter alia, the compatibility of the binders and the mechanical integrity requires for the service in which the foamed plastic will be replaced. Dissimilar binders which may be employed in conjunction with the inorganic binder composition include the resins disclosed hereinbefore which may optionally be incorporated into the inorganic binder composition and those elastomers disclosed as being usefully employed in the pre-coat or as a component in the inorganic binder composition.

In practicing the present invention, the coatings which provide improved heat and flame resistance may be formed on a wide variety of foamed plastics. Foamed plastics which may usefully be employed in the practice of this invention include foams prepared from the following materials: polyimidimide, polyamide, polyamide-imide, polyimide, neoprene, polyvinyl chloride (PVC) copolymers thereof, polyurethane, silicone, phenolic, polycarbonate, polyethylene, polypropylene, polystyrene, ionomer, epoxy, cellulose acetate, acrylic-butadiene-styrene (ABS), acetal, phenylene and oxide-based resin. Inorganic syntactic foams may also be employed. Useful syntactic foams are formed from hollow glass spheres, hollow carbon spheres or hollow ceramic spheres bound together with the inorganic binder composition of this invention (optionally including the alkyl tin catalyst or the inorganic additives disclosed herein). These syntactic foams are prepared by known procedures by mixing the hollow spheres with the inorganic binder composition in liquid form to form a mortar which is then cast into the desired shaped and cured.

Foamed plastics are well known in the art. A discussion of plastic foams, their composition, their preparation and their use is presented in 11 *Kirk-Othmer, Encyclopedia of Chemical Technology* 82–126 (3d ed. 1980).

In practicing this invention, a high temperature flame and heat resistant flexible foamed plastic may be prepared as follows: The flexible foamed plastic is saturated with a colloidal suspension of an elastomer and then compressed between a pair of nip rollers to remove excess elastomer suspension. While the surface of the foamed plastic is still wet, an inorganic binder composition of the invention is applied to the wetted surface so as to saturate it. The treated foamed plastic is then compressed between a pair of nip rollers to remove excess quantities of the inorganic binder composition. Fianlly, the foamed plastic is placed in an oven at a temperature of about 200° to about 300° F. until the surface is thoroughly dry to provide flame and heat resistant flexible foamed plastic of the invention. When the surface is dried, the inorganic binder coating will not become rewet when immersed in water.

Where the inorganic binder composition is combined with a dissimilar binder, coated foamed plastics can be prepared therefrom following the above procedure. Further, where the foamed plastic is rigid, those portions of the above procedure involving the application of the precoat of elastomer may be eliminated.

The high temperature, flame resistant foamed plastic composition of the present invention exhibits the following properties:

1. Flexibility—A flexible foam can be treated so that its flexibility will be retained.
2. High temperature flame resistance—A foam treated in accordance with the present invention, such as a polyamide-imide foam, will resist the impact of a 2,000° F. propane blow torch flame for 30 seconds without the impinging flame burning through a treated 1 inch thick section of foam.
3. Foam shrinkage—The shrinkage of a foamed plastic, when exposed to a high temperature flame or a high temperature, can be greatly reduced or almost completely blocked when that foam is treated in accordance with the present invention.

4. Reduced smoke emision—Smoke emision from a foamed plastic treated in accordance with this invention, when exposed to a high temperature flame, is greatly reduced or nearly eliminated.

5. Heat transfer—Treated plastic foams will resist the transfer of heat. A 1 inch thick piece of polyamide-imide foam treated in accordance with the present invention and exposed to a temperature of 1,000° F. on one surface will substantially maintain room temperature on the other surface.

6. Breathable plastic foams—Plastic foams which are breathable will retain this property when treated in accordance with this invention.

Several examples of useful formulations which may be employed in this invention are presented in the following tables. The order in which the components are listed in these tables is the order in which the several components are combined to prepare the described composition. The quantities employed are described in terms of "parts" while, unless otherwise stated, is parts by weight.

A preferred silicone saturant composition employed as a pre-coat where flexibility of the foam is to be maintained is set forth in Table I.

TABLE I

| Silicone Saturant Pre-coat | |
|---|---|
| | Parts |
| 1. Silicone Elastomer (40% Solids) Dow/Corning Q3-5075 | 10 |
| 2. Water | 90 |
| TOTAL | 100 |
| Percent Solids: 4% | |

The silicone saturant pre-coat can be formulated over the range of solids concentrations as shown in Table II.

TABLE II

| | FROM Parts | TO Parts |
|---|---|---|
| 1. Silicone Elastomer | 10 | 10 |
| 2. Water | 30 | 390 |
| TOTAL | 40 | 400 |
| Percent Solids | 10% | 1% |

A preferred formula of an inorganic binder composition of the invention which provides increased heat and flame resistance to a foamed plastic is set forth in Table III.

TABLE III

| | Parts |
|---|---|
| 1. Water | 30 |
| 2. Colloidal Silica (34% Solids) NYACOL 2034 Di | 30 |
| 3. Monoaluminum Phosphate (MAP) (42% Solids) | 5 |
| 4. Aluminum Chlorohydrate (ACH) (32% Solids) | 5 |
| 5. Catalyst 182 A (21% Solids) Dow/Corning | 2 or 3 |
| 6. Water | 120 |
| 7. Phenolic Resin (52% Solids) BKUA 2370 | 2 |
| Percent Solids 7.4% | |

The fifth component in this formulation is the catalyst which is an optional component and need not be included where the additional bonding it provides is not desired or necessary. In addition, the seventh component, the water soluble organic resin, is also an optional portion of the inorganic binder composition. Further, where the presence of a water soluble organic resin in the inorganic binder composition is found to be necessary, other organic resins, as disclosed herein, may be substituted for the phenolic resin.

Table IV below describes a preferred inorganic binder composition wherein an elastomer, employed to retain the flexibility of the foam, is incorporated into the inorganic binder composition as one of the alternate embodiments of practicing the present invention. It should also be noted that this formula contains a catalyst which, again, is optional and may be excluded. It also includes a resin as the eighth component. This resin may be excluded or other organic resins disclosed herein may be substituted therefor. This composition incorporates another optional component. Component nine is alumina silica fiber. This is an illustration of the use of an inorganic additive to further improve the temperature, flame and heat resistance of the foamed plastic. As is described hereinabove, other inorganic additives may be substituted or used in combination with the alumina silica fiber. Where the added improvements achieved by these inorganic additives are not necessary, this component of the formulation may excluded. The alternate inorganic binder composition of Table IV is a combination of the elastomer pre-coat composition and the inorganic binder composition. These portions of the final composition may be combined to prepare this alternate inorganic binder composition in the following range of percentages, based on their respective wet weights: the pre-coat composition may comprise from about 5 to about 35 percent, while the inorganic binder composition may comprise from about 95 to about 70 percent of this alternate inorganic binder composition.

TABLE IV

| SATURANT FORMULA - ALTERNATE | |
|---|---|
| | Parts |
| 1. Water | 120 |
| 2. Silicone Elastomer (40% Solids Dow/Corning | 10 |
| 3. Colloidal Silica (34% Solids) NYACOL 2034 Di | 30 |
| 4. Monoaluminum Phosphate (MAP) (42% Solids) | 5 |
| 5. Aluminum Chlorohydrate (ACH) (32% Solids) | 5 |
| 6. Catalyst 182 A (21% Solids) Dow/Corning | 3 |
| 7. Water | 120 |
| 8. Phenolic Resin (52% Solids) BKUA 2370 | 2 |
| 9. Alumina Silica Fiber Fiberfrax | 15 |
| TOTAL | 310 |
| Percent Solids 11.1% | |

Where a foamed plastic may be subjected to extremely high temperature, a particularly preferred inorganic binder composition containing graphite may be employed. Table V below describes such a graphite containing composition. It should be noted that the polyethylene glycol mono-oleate included in this inorganic binder acts as a dispersant-modifier-stabilizer to enhance the effect of the graphite. In addition, an elastomer is not included in this composition. As with the other compositions disclosed herein, this composition contains a catalyst which may be excluded if added bonding is not necessary. Further, other organic resins, alone or in combination, may be employed with or substituted for the phenolic resin.

TABLE V

| | Parts |
|---|---|
| 1. Water | 30 |
| 2. Colloidal Silica (34% Solids) NYACOL 2034 Di | 10 |
| 3. Monoaluminum Phosphate (MAP) (42% Solids) | 5 |
| 4. Aluminum Chlorohydrate (ACH) (32% Solids) | 5 |
| 5. Polyethylene glycol mono-oleate Pegosperse 400 ML | 2 |
| 6. Graphite #850 | 5 |
| 7. Water | 300 |
| 8. Phenolic Resin (50% Solids) | 2 |
| 9. Catalyst 182A (21% Solids) Dow Corning | 2 |
| TOTAL | 361 |

As discussed hereinbefore, the inorganic binder composition conventionally is formulated from colloidal silica, MAP, ACH, water and, optionally, an organo tin halide. In addition, other components such as water soluble organic resins, elastomers and/or inorganic additives, may optionally be incorporated into the inorganic binder composition during its preparion to further improve the heat and flame resistance properties of the plastic foam when treated with the inorganic binder composition. Besides being applied to the plastic foams in its "as formulated" condition, the inorganic binder composition of the present invention may be added to other binders, i.e., dissimilar binders, to enhance the bonding, the tensile strength and/or the heat resistance of the plastic foams to which the combination of binders is applied. The inorganic binder may constitute about 0.1 to about 99 wt. %, preferably about 0.5 to about 50 wt. % of the combined weights of the inorganic binder composition and the dissimilar binder. Useful dissimilar binders include any of the water soluble organic resins or the elastomers disclosed hereinbefore.

The following illustrates an example of a foamed plastic treated in accordance with the present invention to provide it with improved heat and flame resistance.

A 1 inch thick sheet of flexible polyimidimide foam was placed in an open tray and saturated with the precoat formula having the composition of that set forth in Table I. The excess of the elastomer composition was squeezed out of the foam by compressing the treated foam beneath a pair of nip rollers. While the foam was still damp from the elastomer treatment, it was again placed in a tray and saturated with the inorganic binder composition set forth in Table III. Any excess of the inorganic binder composition was removed by compressing the treated foam between a pair of nip rollers. The thus treated foam was then placed in an oven at a temperature of 250° F. until it was thoroughly dried.

The treated foamed plastic was compared with an untreated piece of the same material and found to have substantially the same flexibility as the control. Further, the inorganic coating formed on the polyimidimide foamed plastic was not rewettable even when immersed in water.

To evaluate the flame and heat resistant properties of the treated and untreated foam, samples of each were suspended from a horizontal rod and subjected to the impact of a 2,000° F. propane torch flame for 30 seconds. The untreated polyimidimide foam burned through within a few seconds, whereas at the end of 30 seconds, the foam treated in accordance with the present invention was not burned through.

What is claimed is:

1. A high temperature and flame resistant foamed plastic composition comprising:
   (a) a foamed plastic;
   (b) a first coating formed on the surface of the foamed plastic comprising an elastomer; and
   (c) a second coating of an inorganic binder composition formed on the surface of the first coating, said inorganic binder composition comprising:
      (i) colloidal silica,
      (ii) monoaluminum phosphate, and
      (iii) aluminum chlorohydrate.

2. A composition according to claim 1 wherein the inorganic binder composition additionally comprises an amount of an alkyl tin halide catalyst effective to increase the bonding of the inorganic binder composition when applied to a substrate.

3. A composition according to claim 2 wherein the alkyl tin halide is tri-alkyl tin chloride.

4. A composition according to claim 3 wherein the tri-alkyl tin chloride is tri-butyl tin chloride.

5. A composition according to claims 1 or 2 wherein the elastomer is a neoprene, a nitrile, a silicone or a butadiene elastomer or mixtures thereof.

6. A composition according to claims 1 or 2 wherein the inorganic binder composition additionally comprises graphite, high temperature carbon, carbon fiber, alumina silica fiber, colloidal alumina, colloidal magnesium, alumina fiber, mica, refractory oxides or mixtures thereof.

7. A composition according to claims 1 or 2 wherein the inorganic binder composition additionally comprises a water soluble organic resin or an elastomer.

8. A composition according to claim 7 wherein the water soluble organic resin is an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof and the elastomer is a neoprene, a nitrile, a silicone or a butadiene elastomer or mixtures thereof.

9. A composition according to claims 1 or 2 wherein the second coating additionally comprises a binder dissimilar to the inorganic binder composition.

10. A composition according to claim 9 wherein the dissimilar binder is a water soluble organic binder.

11. A composition according to claim 10 wherein the organic binder comprises an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, phenolic, a urea formaldehyde, an epoxy, a fluorocarbon or a polysulfone resin or mixtures thereof.

12. A composition according to claim 10 wherein the organic binder comprises a neoprene, a nitrile, a silicone, a urethane or a butadiene elastomer or mixtures thereof.

13. A composition according to claim 9 wherein the inorganic binder composition is about 1.0 to about 99.9% by weight of the combined weights of the inorganic binder composition and the dissimilar binder.

14. A composition according to claim 1 wherein the foamed plastic comprises polyamide-imide, polyamide, polyimidimide, polyimide, poly(vinyl-chloride), polyurethane, silicone, phenolic, polycarbonate, polyethylene, polypropylene, polystyrene, ionomer, epoxy, acrylic-butadiene-styrene, acetal or phenylene oxide-based resin foam or syntactic foam comprising:
   (a) hollow glass spheres, hollow carbon spheres or hollow ceramic spheres, and
   (b) an inorganic binder composition comprising colloidal silica, monoaluminum phosphate and aluminum chlorohydrate.

15. A composition according to claim 14 wherein the inorganic binder composition of the syntactic foam additionally comprises an alkyl tin halide catalyst.

16. A high temperature and flame resistant foamed plastic composition comprising:
   (a) a foamed plastic, and
   (b) a coating of an inorganic binder composition formed on the surface of the foamed plastic, said inorganic binder composition comprising:
      (i) colloidal silica,
      (ii) monoaluminum phosphate, and
      (iii) aluminum chlorohydrate.

17. A composition according to claim 16 wherein the inorganic binder composition additionally comprises an amount of an alkyl tin halide catalyst effective to increase the bonding of the inorganic binder composition when applied to a substrate.

18. A composition according to claim 17 wherein the alkyl tin halide is tri-alkyl tin chloride.

19. A composition according to claim 18 wherein the tri-alkyl tin chloride is tri-butyl tin chloride.

20. A composition according to claims 16 or 17 wherein the inorganic binder composition additionally comprises graphite, high temperature carbon, carbon fiber, alumina silica fiber, colloidal alumina, colloidal magnesium, alumina fiber, mica, refractory oxides or mixtures thereof.

21. A composition according to claims 16 or 17 wherein the inorganic binder composition additionally comprises a water soluble organic resin or an elastomer.

22. A composition according to claim 21 wherein the water soluble resin binder is an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof and the elastomer is a neoprene, a nitrile, a silicone, a butadiene elastomer or mixtures thereof.

23. A composition according to claims 16 or 17 wherein the coating additionally comprises a binder dissimilar to the inorganic binder composition.

24. A composition according to claim 23 wherein the dissimilar binder is a water soluble organic binder.

25. A composition according to claim 24 wherein the organic binder comprises an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, phenolic, a urea formaldehyde, an epoxy, a fluorocarbon or a polysulfone resin or mixtures thereof.

26. A composition according to claim 24 wherein the organic binder comprises a neoprene, a nitrile, a silicone, a urethane or a butadiene elastomer or mixtures thereof.

27. A composition according to claim 23 wherein the inorganic binder composition is 1.0 to 99.9% by weight of the combined weights of the inorganic binder composition and the dissimilar binder.

28. A composition according to claim 16 wherein the foamed plastic comprises polyamide-imide, polyamide, polyimidimide, polyimide, poly(vinyl-chloride), polyurethane, silicone, phenolic, polycarbonate, polyethylene, polypropylene, polystyrene, ionomer, epoxy, acrylic-butadiene-styrene, acetal or phenylene oxide-based resin foam or syntactic foam comprising:
   (a) hollow glass spheres, hollow carbon spheres or hollow ceramic spheres, and
   (b) an inorganic binder composition comprising colloidal silica, monoaluminum phosphate and aluminum chlorohydrate.

29. A composition according to claim 28 wherein the inorganic binder composition of the syntactic foam additionally comprises an alkyl tin halide catalyst.

30. A method of preparing a high temperature and flame resistant foamed plastic composition comprising:
   (a) forming a first coating of an aqueous colloidal suspension of an elastomer on the surface of a foamed plastic;
   (b) forming a second coating on the surface of the first coating of an inorganic binder composition comprising:
      (i) colloidal silica
      (ii) monoaluminum phosphate, and
      (iii) aluminum chlorohydrate; and
   (c) heating the coated foamed plastic for a period of time and under heating conditions effective to provide the foamed plastic with a dry coated surface.

31. A method according to claim 30 wherein the second coating additionally comprises an alkyl tin halide.

32. A method according to claim 31 wherein the alkyl tin halide is tri-butyl tin chloride.

33. A method according to claims 30 or 31 wherein the elastomer is a neoprene, a nitrile, a silicone, a butadiene elastomer or mixtures thereof.

34. A method according to claims 30 or 31 wherein the inorganic binder composition additionally comprises graphite, high temperature carbon, carbon fiber, alumina silica fiber, colloidal alumina, colloidal magnesium, alumina fiber, mica, refractory oxides or mixtures thereof.

35. A method according to claims 30 or 31 wherein the inorganic binder composition additionally comprises a water soluble resin binder or an elastomer.

36. A method according to claim 35 wherein the water soluble resin binder is an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof and the elastomer is a neoprene, a nitrile, a silicone, a butadiene elastomer or mixtures thereof.

37. A method according to claims 30 or 31 wherein the second coating additionally comprises a binder dissimilar to the inorganic binder composition.

38. A method according to claim 37 wherein the dissimilar binder is a water soluble organic binder.

39. A method according to claim 38 wherein the organic binder comprises an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof.

40. A method according to claim 38 wherein the organic binder comprises a neoprene, a nitrile, a silicone, a urethane or a butadiene elastomer or mixtures thereof.

41. A method according to claim 37 wherein the inorganic binder composition is about 1.0 to about 99.9% by weight of the combined weights of the inorganic binder composition and the dissimilar binder.

42. A method according to claim 30 wherein the foamed plastic comprises polyamide-imide, polyamide, polyimidimide, polyimide, poly(vinyl-chloride), polyurethane, silicone, phenolic, polycarbonate, polyethylene, polypropylene, polystyrene, ionomer, epoxy, acrylic-butadiene-styrene, acetal or phenylene oxide-based resin foam or syntactic foam comprising:
   (a) hollow glass spheres, hollow carbon spheres or hollow ceramic spheres, and
   (b) an inorganic binder composition comprising colloidal silica, monoaluminum phosphate and aluminum chlorohydrate.

43. A method according to claim 42 wherein the inorganic binder composition of the syntactic foam additionally comprises an alkyl tin halide catalyst.

44. A method of preparing a high temperature and flame resistant foamed plastic composition comprising:
   (a) forming a coating on the surface of a foamed plastic of an inorganic binder composition comprising:
      (i) colloidal silica,
      (ii) monoaluminum phosphate, and
      (iii) aluminum chlorohydrate; and
   (b) heating the coated foamed plastic for a period of time and under heating conditions effective to provide the foamed plastic with a dry coated surface.

45. A method according to claim 44 wherein the coating additionally comprises an alkyl tin halide.

46. A method according to claim 45 wherein the alkyl tin halide is tri-butyl tin chloride.

47. A method according to claims 44 or 45 wherein the inorganic binder composition additionally comprises graphite, high temperature carbon, carbon fiber, alumina silica fiber, colloidal alumina, colloidal magnesium, alumina fiber, mica, refractory oxides or mixtures thereof.

48. A method according to claims 44 or 45 wherein the inorganic binder composition additionally comprises a water soluble resin binder or an elastomer.

49. A method according to claim 48 wherein the water soluble resin binder is an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof and the elastomer is a neoprene, a nitrile, a silicone, a butadiene elastomer or mixtures thereof.

50. A method according to claims 44 or 45 wherein the coating additionally comprises a binder dissimilar to the inorganic binder composition.

51. A method according to claim 50 wherein the dissimilar binder is a water soluble organic binder.

52. A method according to claim 51 wherein the organic binder comprises an acrylic, a styrene butadiene, a vinyl acrylic, a polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof.

53. A method according to claim 51 wherein the organic binder comprises a neoprene, a nitrile, a silicone, a urethane or a butadiene elastomer or mixtures thereof.

54. A method according to claim 50 wherein the inorganic binder composition is 1.0 to 99.9% by weight of the combined weights of the inorganic binder composition and the dissimilar binder.

55. A method according to claim 44 wherein the foamed plastic comprises polyamide-imide, polyamide, polyimidimide, polyimide, poly(vinyl-chloride), polyurethane, silicone, phenolic, polycarbonate, polyethylene, polypropylene, polystyrene, ionomer, epoxy, acrylic-butadiene-styrene, acetal or phenylene oxide-based resin foam or syntactic foam comprising:
   (a) hollow glass spheres, hollow carbon spheres or hollow ceramic spheres, and
   (b) an inorganic binder composition comprising colloidal silica, monoaluminum phosphate and aluminum chlorohydrate.

56. A method according to claim 55 wherein the inorganic binder composition of the syntactic foam additionally comprises an alkyl tin halide catalyst.

57. A binder composition comprising:
   (a) about 1.0 to about 99.9 wt. % of an inorganic binder composition comprising:
      (i) colloidal silica,
      (ii) monoaluminum phosphate,
      (iii) aluminum chlorohydrate, and
      (iv) water; and
   (b) about 99 to about 0.1 wt. % of a dissimilar binder and water, said dissimilar binder being compatible with the inorganic binder composition.

58. A composition according to claim 57 wherein the inorganic binder composition additionally comprises an amount of an alkyl tin halide catalyst effective to increase the bonding of the inorganic binder composition when applied to a substrate.

59. A composition according to claim 58 wherein the alkyl tin halide is tri-alkyl tin chloride.

60. A composition according to claim 59 wherein the tri-alkyl tin chloride is tri-butyl tin chloride.

61. A composition according to claims 57 or 58 wherein the dissimilar binder is a water soluble organic binder.

62. A composition according to claim 61 wherein the organic binder comprises an acrylic, a styrene butadiene, a vinyl acrylic, polyvinyl chloride, a polyvinylidene chloride, a vinyl acetate, a styrene, a styrene acrylic, a polyvinyl alcohol, a polyurethane, a silicone polyester, a polyamide, a polyimide, a polyamide-imide, an alkyl, a phenolic, a urea formaldehyde, an epoxy, a fluorocarbon or a polysulfone resin or mixtures thereof.

63. A composition according to claim 61 wherein the organic binder comprises a neoprene, a nitrile, silicone, a urethane or a butadiene elastomer or mixtures thereof.

64. A composition according to claims 57 or 58 wherein the inorganic binder composition additionally comprises graphite, high temperature carbon, carbon fiber, alumina silica fiber, colloidal alumina, colloidal magnesium, alumina fiber, mica, refractory oxides or mixtures thereof.

* * * * *